US012792436B2

(12) United States Patent
Doudna et al.

(10) Patent No.: US 12,792,436 B2
(45) Date of Patent: Nov. 10, 2026

(54) FAILSAFE BACKUP MODE IN AN IMPLANTABLE MEDICAL DEVICE

(71) Applicant: Pacesetter, Inc., Sylmar, CA (US)

(72) Inventors: David P. Doudna, Sunnyvale, CA (US); Dean Andersen, San Jose, CA (US)

(73) Assignee: Pacesetter, Inc., Sylmar, CA (US)

( * ) Notice: Subject to any disclaimer, the term of this patent is extended or adjusted under 35 U.S.C. 154(b) by 36 days.

(21) Appl. No.: 19/193,555

(22) Filed: Apr. 29, 2025

(65) Prior Publication Data

US 2025/0360321 A1 Nov. 27, 2025

Related U.S. Application Data

(60) Provisional application No. 63/651,333, filed on May 23, 2024.

(51) Int. Cl.
*G06F 11/07* (2006.01)
*G06F 11/18* (2006.01)
*G06F 11/22* (2006.01)

(52) U.S. Cl.
CPC ........ *G06F 11/0736* (2013.01); *G06F 11/073* (2013.01); *G06F 11/0793* (2013.01); *G06F 11/187* (2013.01); *G06F 11/2205* (2013.01); *G06F 2201/88* (2013.01)

(58) Field of Classification Search
CPC ............... G06F 11/073; G06F 11/0736; G06F 11/0793; G06F 11/187; G06F 11/2205; G06F 2201/88
See application file for complete search history.

(56) References Cited

U.S. PATENT DOCUMENTS

| | | | | |
|---|---|---|---|---|
| 5,653,735 | A | 8/1997 | Chen et al. | |
| 6,442,428 | B1 | 8/2002 | Shankar et al. | |
| 9,092,552 | B2 * | 7/2015 | Nair ........................ | G16H 40/40 |
| 9,320,883 | B2 * | 4/2016 | Huelskamp ............ | G16H 40/40 |
| 10,124,176 | B2 | 11/2018 | Wu et al. | |

(Continued)

FOREIGN PATENT DOCUMENTS

CN 112469468 3/2021

OTHER PUBLICATIONS

Extended European Search Report dated Oct. 17, 2025, European Patent Application No. 25174528.7-1207.

*Primary Examiner* — Joseph R Kudirka
(74) *Attorney, Agent, or Firm* — Pearl Cohen LLP

(57) ABSTRACT

Embodiments described herein relate to an IMD operating in a backup mode in a manner that mitigates against adverse effects of a memory failure. The IMD includes a NVM that stores backup mode firmware, a RAM that includes multiple separate RAM blocks, a processor, and a counter. The processor executes the backup mode firmware to operate the IMD in accordance with a backup mode in response to detection of a malfunction that when detected should cause the IMD to operate in accordance with the backup mode. While the processor operates the IMD in accordance with the backup mode the processor stores and accesses variables in one of the RAM blocks. The counter is selectively incremented and used to select which one of the RAM blocks the variables are stored within while the processor executes the backup mode firmware to operate the IMD in accordance with the backup mode.

20 Claims, 4 Drawing Sheets

(56) References Cited

U.S. PATENT DOCUMENTS

| | | | |
|---|---|---|---|
| 2017/0010933 | A1 | 1/2017 | Wang et al. |
| 2019/0196734 | A1 | 6/2019 | Doudna et al. |
| 2022/0401743 | A1 | 12/2022 | Doerr |

* cited by examiner

FAILSAFE BACKUP MODE IN AN IMPLANTABLE MEDICAL DEVICE

PRIORITY CLAIM

This application claims priority to U.S. Provisional Patent Application No. 63/651,333, filed May 23, 2024, which is incorporated herein by reference.

FIELD OF TECHNOLOGY

Embodiments of the present technology generally relate to an implantable medical device (IMD) operating in a backup mode in a manner that mitigates against adverse effects of memory failure.

BACKGROUND

Class III medical devices often implement failure mitigations, such as a "backup mode." Class III medical devices include the highest risk devices that require premarket approval. Class III devices usually sustain or support life, are implanted and are regulated by, for instance, the U.S. Food and Drug Administration (FDA). Examples of Class III medical devices include implantable pacemakers and implantable cardioverter-defibrillators (ICDs), which are types of implantable medical devices (IMDs).

The backup mode is used to cover some of the more common types of failure mechanisms by bypassing functional blocks, which are not necessary to provide life-sustaining therapy. The backup mode supports basic communication and sustained minimal controls necessary to operate the medical device in a clinical environment. The backup mode referred to herein is also sometimes referred to as a safety mode or a restricted mode.

During the backup mode some components (e.g., the battery) and some circuits essential for the medical device to provide therapy or support communications must still be supported. The backup mode cannot mitigate failure in these components and circuits. For a pacemaker, a backup mode provides basic sensing and pacing. Other features of a pacemaker can be shut down during the backup mode, such as firmware that was downloaded into a random-access memory (RAM) that it is executed during a normal operational mode.

Two techniques have been typically used to provide a backup mode for an IMD that delivers therapy. A first technique replaces the on-board microprocessor or microcontroller unit (MCU) used in the normal operational mode with an independent Finite State Machine (FSM) used in the backup mode. To implement the first technique the IMD typically switches between the MCU and the FSM, with operation switching to the FSM during the backup mode. A second technique uses a non-volatile memory (NVM), which may be a read only memory (ROM), to store the firmware, and uses an MCU without an FSM. In the second technique, during a backup mode the firmware and parameters programmed in the RAM prior to backup mode are replaced with the NVM or ROM during the backup mode.

For the second technique that uses an MCU without a FSM, the RAM is used during both normal operation (aka the normal operational mode) and the backup mode (aka the backup operational mode), but with more limited use during the backup mode. The MCU in normal operation has a significant amount of firmware to control the microprocessor with the firmware being programmed into the RAM. The RAM, however, also stores variables used by the microprocessor. The RAM is used for storing variables in both the normal operation and backup mode.

SUMMARY

Certain embodiments of the present technology relate to an implantable medical device (IMD) that includes a non-volatile memory (NVM), random access memory (RAM), a processor, and a counter. The NVM stores backup mode firmware. The RAM includes multiple separate RAM blocks. The processor is configured to execute the backup mode firmware to operate the IMD in accordance with a backup mode in response to detection of a malfunction that when detected should cause the IMD to operate in accordance with the backup mode. While the processor operates the IMD in accordance with the backup mode the processor is configured to store and access variables in one of the RAM blocks. The counter is configured to be selectively incremented and used to select which one of the RAM blocks the variables are stored within while the processor executes the backup mode firmware to operate the IMD in accordance with the backup mode.

In certain embodiments, the counter is optionally incremented in conjunction with a device reset operation that occurs in response to the detection of the malfunction that causes the processor to operate the IMD in accordance with the backup mode, and the counter is incremented in conjunction with a detection of a further malfunction that is detected while the processor operates the IMD in accordance with the backup mode.

In certain embodiments, the IMD includes circuitry configured to detect the malfunction that causes the processor to operate the IMD in accordance with the backup mode. In certain such embodiments, the circuitry configured to detect the malfunction causes the device reset operation. In certain embodiments, the circuitry configured to detect the malfunction uses one or more watchdogs to detect the malfunction.

In certain embodiments, after the device reset operation is performed that results in the counter being incremented the processor and/or further circuitry is configured to perform a memory test on the one of the RAM blocks selected using the counter. In certain such embodiments, in response to the one of the RAM blocks selected using the counter failing the memory test, a further instance of the device reset operation is performed, which results in the counter being further incremented and used to select a different one of the RAM blocks for storing the variables while the processor operates the IMD in accordance with the backup mode. The processor can be configured to perform the memory test, or alternatively, the IMD can include dedicated hardware that is configured to perform the memory test.

In certain embodiments, the counter is implemented using one or more logic gates and maintains one or more bits.

In certain embodiments, the IMD includes a multiplexer that is controlled by the counter to identify the one of the RAM blocks within which the variables are stored by the processor while the processor executes the backup mode firmware to operate the IMD in accordance with the backup mode.

In certain embodiments, N copies of the counter are maintained, where N is an odd integer that is at least 3, and majority voting is used to determine a value of the counter at any given time.

In certain embodiments, at least some firmware or variables that had previously been stored in the one of the RAM blocks during a normal operational mode, are replaced by the variables that are stored while the processor executes the backup mode firmware to operate the IMD in accordance with the backup mode.

Certain embodiments of the present technology are directed to a method for use with an implantable medical device (IMD) that includes a processor, a counter, a non-volatile memory (NVM) that stores backup mode firmware, and a random access memory (RAM) that includes multiple separate RAM blocks. The method comprises: monitoring for and detecting a malfunction that when detected should cause the IMD to operate in accordance with a backup mode; in response to the malfunction being detected, performing a device reset operation of the IMD, incrementing the counter, and the processor executing the backup mode firmware and thereby operating the IMD in accordance with the backup mode; and while the processor is executing the backup mode firmware and thereby operating the IMD in accordance with the backup mode, the processor storing and accessing variables in one of the RAM blocks identified using the counter following the incrementing of the counter.

Certain embodiments of the present technology are directed to a method comprising: monitoring for and detecting a malfunction that when detected should cause an implantable medical device (IMD) to operate in accordance with a backup mode; in response to the malfunction being detected, performing a device reset operation of the IMD, incrementing a counter of the IMD, and a processor of the IMD executing backup mode firmware stored in a non-volatile memory (NVM) of the IMD and thereby operating the IMD in accordance with the backup mode; and while the processor is executing the backup mode firmware and thereby operating the IMD in accordance with the backup mode, the processor storing and accessing variables in one of multiple random access memory (RAM) blocks included in a RAM of the IMD identified using the counter following the incrementing of the counter.

In certain embodiments, the method further includes, while the processor is executing the backup mode firmware and thereby operating the IMD in accordance with the backup mode, detecting a further malfunction; and in response to the further malfunction being detected, performing a further device reset operation of the IMD, further incrementing the counter, and the processor re-executing the backup mode firmware and thereby further operating the IMD in accordance with the backup mode. Additionally, while the processor is re-executing the backup mode firmware and thereby further operating the IMD in accordance with the backup mode, the method includes the processor storing and accessing variables in another one of the RAM blocks identified using the counter after the further incrementing of the counter.

In certain embodiments, the monitoring for and detecting the malfunction is performed using one or more watchdogs.

In certain embodiments, the method comprises, after performing the device reset operation that results in the counter being incremented: performing a memory test operation on the one of the RAM blocks identified using the counter; and in response to the one of the RAM blocks identified using the counter failing the memory test, detecting a further malfunction and performing a further instance of the device reset operation, which results in the counter being further incremented and used to identify another one of the RAM blocks for storing the variables while the processor is re-executing the backup mode firmware and thereby further operating the IMD in accordance with the backup mode.

In certain embodiments, the method comprises using a multiplexer, controlled by the counter, to identify the one of the RAM blocks within which the variables are stored by the processor while the processor is executing the backup mode firmware and thereby operating the IMD in accordance with the backup mode.

In certain embodiments, the method comprises maintaining N copies of the counter, where N is an odd integer that is at least 3, and using majority voting to determine a value of the counter at any given time.

In certain embodiments, the method comprises replacing at least some firmware or variables that had previously been stored in the one of the RAM blocks during a normal operational mode, with the variables that are stored while the processor is executing the backup mode firmware and thereby operating the IMD in accordance with the backup mode.

Certain embodiments of the present technology are directed to an IMD including NVM that stores backup mode firmware, RAM that includes multiple separate RAM blocks, a processor, and a counter. The processor executes the backup mode firmware to operate the IMD in accordance with a backup mode, wherein when the processor operates the IMD in the backup mode the processor stores and accesses variables in one of the RAM blocks. The counter is selectively incremented after a reset operation and used to select which one of the RAM blocks the variables are stored within.

In certain embodiments, after the reset operation occurs: a memory test is performed on the one of the RAM blocks selected using the counter; and in response to the one of the RAM blocks selected using the counter failing the memory test, a further device reset operation is performed, which results in the counter being further incremented and used to select a different one of the RAM blocks for storing the variables.

In certain embodiments, at least some of the firmware that had previously been stored in the RAM during a normal operational mode is provided in NVM during the backup mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present technology generally relate to handling or mitigating against adverse effects of a memory failure while an implantable medical device (IMD) operates in a backup mode. Embodiments described herein address the problem of failure of one or more portions of random-access memory (RAM) in an IMD. When a RAM failure occurs, at least some firmware that is normally contained in RAM can instead operate from non-volatile memory (NVM) during a backup mode. However, some variables, as required by the firmware, are still stored in a portion of RAM that cannot be stored in NVM. The portion of RAM being used to store the variables can potentially be experiencing failure due to a fault (aka defect) in the RAM. To address this problem, multiple different blocks of RAM are defined that can store the variables and a counter is used to identify which block of RAM is used for the storage of the variables. If a failure of the selected RAM block is detected, the counter is incremented to identify a different block of RAM until a block of RAM is identified that has not experienced a memory failure. It is noted that the terms "block of RAM" and "RAM block" are used interchangeably herein. Further, it is also noted that an IMD is often referred to herein as a system.

Figure 1:
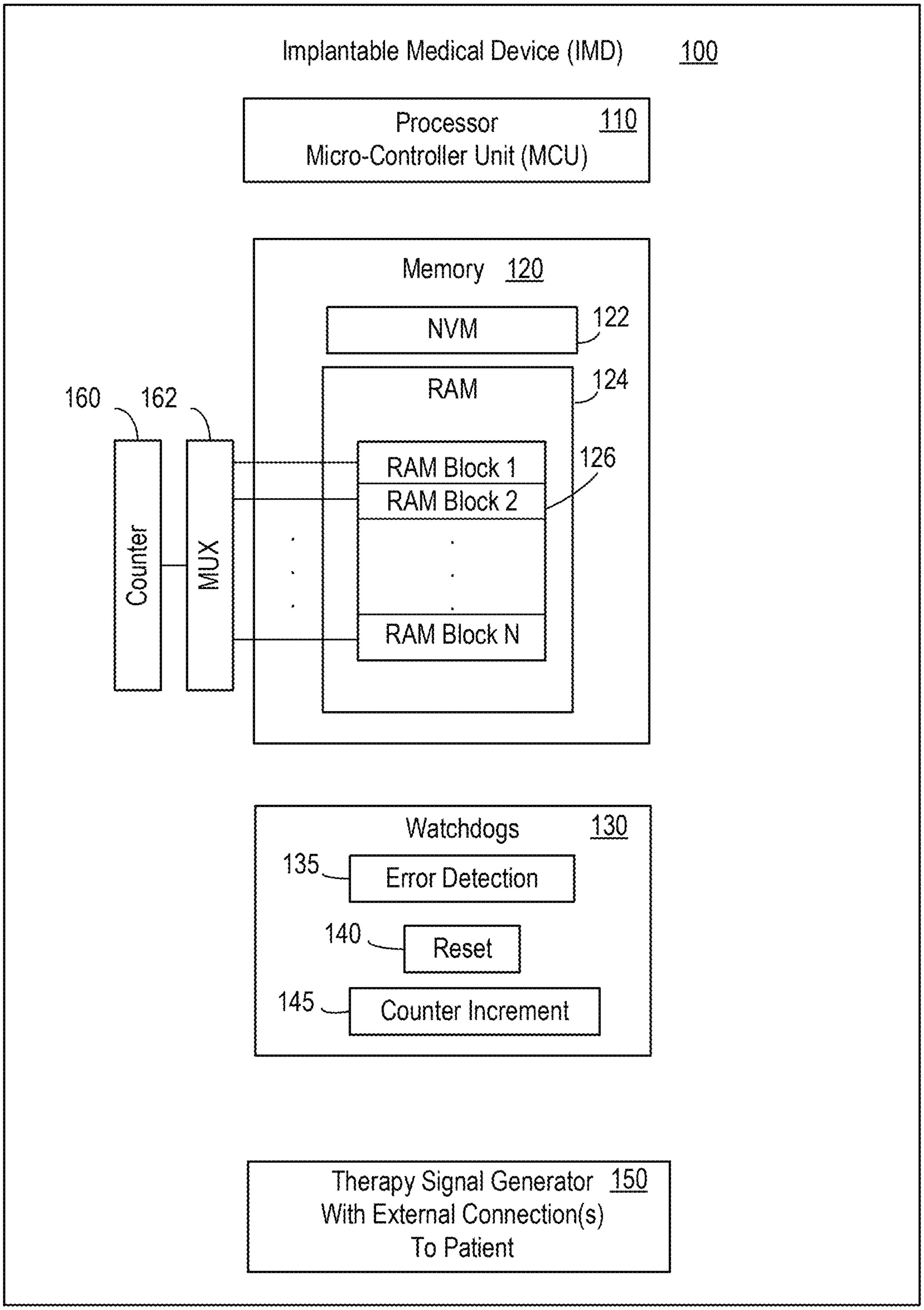
FIG. 1 is a high level block diagram of an example IMD with which embodiments of the present technology may be utilized.

FIG. 1 shows a high level block diagram of an example IMD 100 with which embodiments of the present technology may be utilized. As shown, the IMD 100 includes a processor or MCU 110 and a memory 120. The memory 120 is shown to include non-volatile memory (NVM) 122, which may be read-only memory (ROM). The memory 120 also includes RAM 124. In operation, code, such as firmware, that is executed by the MCU 110 can be stored in the NVM 122 and/or the RAM 124. The firmware may be stored in the NVM 122 and loaded into the RAM 124 for operation during normal operation to make memory access and, thus, operation speed faster or for other performance reasons, such a lower power operation. Alternatively, the firmware may have been downloaded into the RAM from an external instrument sometimes referred to as a "programmer". Variables used by the firmware are identified during operation of the IMD 100 and are typically stored only in the RAM 124 and are not stored separately in the NVM 122. As shown, the RAM 124 includes multiple RAM blocks 126, which may also be referred to herein as blocks 126 of the RAM 124. In accordance with certain embodiments described herein, a block 126 of the RAM 124 stores variables used by firmware stored within the NVM 122 when the IMD 100 is operating in a backup mode.

The IMD 100 of FIG. 1 can also include watchdogs 130 that are implemented in hardware that may include error detection circuitry 135, reset trigger circuitry 140, and counter incrementing circuitry 145. The error detection circuitry 135, which can also be referred to as malfunction detection circuitry 135, can be configured to detect one or more types of malfunctions, including, but not limited to, a failure in a portion of the RAM 124 and/or a failure in another component of the IMD 100 (e.g., a data bus attempting to read or write at an address that is not mapped to any resource). The error detection circuitry 135 can cause the reset trigger circuitry 140 to trigger a reset and system reboot. Once the error detection circuitry 135 detects a malfunction that when detected should cause the IMD to operate in accordance with a backup mode, the watchdogs 130 can trigger the IMD 100 to transition to operating in the backup mode. A system reset triggered by the watchdogs 130 can trigger a further reset operation when one or more further malfunctions is/are detected after the IMD 100 has already started operation in the backup mode. For example, if a RAM block 126 that is used in the backup mode is determined to be defective, the watchdog 130 can trigger a further reset to cause a different RAM block 126 to be utilized for storing variables during the backup mode, in accordance with certain embodiments of the present technology. The watchdogs 130 can also be referred to herein as watchdog circuits 130.

The IMD 100 of FIG. 1 further includes a therapy signal generator 150 that has one or more external connections to a patient. For example, if the IMD 100 is an implantable pacemaker, the therapy signal generator 150 can produce pacing stimulation pulses for deliver to the patient's heart as controlled to treat bradycardia, to perform cardiac resynchronization therapy (CRT), and/or attempt to convert a tachyarrhythmia to a normal sinus rhythm, but not limited thereto. For another example, if the IMD 100 is an ICD, the therapy signal generator 150 can produce shocking pulses used to terminate a ventricular fibrillation (VF), but not limited thereto. Electrodes that are used to deliver pacing stimulation pulses and/or shocking pulses can be located on one or more leads that is/are electrically coupled to the IMD 100. Alternatively, where the IMD 100 is a leadless pacemaker, the electrodes used to deliver pacing stimulation pulses can be located on and/or in very close proximity to the IMD 100 itself without the need for any leads.

The IMD 100 shown in FIG. 1 includes the MCU 110 instead of a finite state machine (FSM). A NVM based backup mode that uses firmware executed by the MCU 110 is advantageous over a FSM-based backup mode. Firmware is usually written to run on an embedded microprocessor MCU 110 rather than designing a custom digital logic FSM to implement the full-featured patient diagnostic and therapy functions. The digital logic gates used to implement the MCU 110 and connections to NVM 122 have been proven extremely reliable. The most likely cause of an MCU 110 failing to run the firmware contained in the RAM 124 is corruption or fault in the writable RAM 124. Reversion from the downloaded RAM firmware to default firmware in the NVM 122 mitigates the threat of corrupted firmware code. However, some amount of the RAM 124 is still required to support the NVM resident firmware used during the backup mode, and more specifically, to store variables for the NVM resident firmware used during the backup mode.

The RAM 124 of the IMD 100 is divided into multiple independent RAM memory blocks 126, rather than there being a single large memory block of RAM. This approach is chosen to provide redundant instances of RAM. A defect (aka failure) that may manifest itself in one block 126 of RAM 124 is highly unlikely to impact any of the other blocks 126 of RAM 124. Portions of the RAM 124, including RAM blocks 126, are re-initialized by the firmware when it reboots after a reset, and the previous contents are erased during the reboot so that new variables can be stored within. The small amount of the RAM 124 needed for operation of backup mode firmware, and more specifically used to store variables used during the backup mode, easily fits within a single one of the RAM blocks 126.

In embodiments described herein, a counter 160 is further provided in the IMD 100 as shown in FIG. 1 for selection of one of the RAM blocks 126, in which to store variables for the backup mode firmware. The counter 160 output is preferably provided to a multiplexer 162 to select one of the RAM blocks 126 that is to be used to store variables when the IMD 100 is operating in the backup mode, wherein the selected one of the RAM blocks 126 is pointed to by the counter 160 controlling the multiplexer 162. When a system reset occurs, which may occur because there is a defect in the RAM block 126 previously selected by the counter 160, the counter 160 is incremented to point to a subsequent one of the RAM blocks 126. Counter incrementing circuitry 145 that is configured to increment the counter 160 can be included in hardware of the watchdogs 130. Resets can occur with the counter 160 incremented each time until a failure in the selected one of the RAM block 126 is no longer detected to cause a reset. In accordance with certain embodiments, the counter 160 is reset by the counter incrementing circuitry 145 at the time of a Power-On-Reset (POR), which occurs only during manufacturing upon first applying power to the IMD 100.

A potential failure within the RAM 124 is a threat because the RAM 124 can occupy the largest area of an integrated circuit of the IMD 100, and it is designed with tighter manufacturing tolerances so the RAM 124 experiences greater vulnerability to manufacturing irregularities than other circuitry within the IMD 100. For a mission-critical application, such as an IMD 100, data stored in the RAM 124 typically includes extra error correction code (ECC) bits. The extra ECC bits support algorithms, such as single-bit error correction double-bit error detection (SECDED), and/or the like. While this provides a layer of robustness against the most typical manifestations of data error, some memory failures may not be mitigated by SECDED. One or more blocks 126 of the RAM 124 can experience soft errors from external factors, such as radiation or electrical interference. These can cause temporary errors that may be mitigated with SECDED. Embodiments described herein prevent a defect (aka failure) in one of the RAM blocks 126 from interfering with the MCU 110 running the backup mode firmware stored in NVM 122 without requiring a separate backup-only memory. The embodiments described herein enable use of the RAM 124 by automatically replacing use of a defective one of the RAM blocks 126 with use of a properly functioning one of the RAM blocks 126 used during the backup mode operation.

As indicated above, the watchdogs 130 implemented in hardware can include error detection circuitry 135, which can also be referred to herein as malfunction detection circuitry 135. The normal non-backup mode firmware and supporting watchdogs 130 implemented in hardware can operate together to monitor the ECC bits or SECDED to detect erroneous operation and whether a malfunction merits reverting to backup mode. These watchdogs 130 enforce various assertions for expected system behavior. A watchdog can monitor a data bus (not specifically shown) for illegal transactions, such as an attempt to read or write at an address, which is not mapped to any resource. Another example where an error may be detected is during a periodic check made by firmware to monitor a watchdog at defined intervals. An error as detected by one of these watchdogs 130 could be the result of a nonrecurring soft error or glitch. So, the first recovery attempted may be a system reset, which attempts to relaunch the therapy application firmware, and more generally, may attempt to operating the IMD in accordance with its normal operation mode. Multiple resets within a certain period of time can be considered evidence of a permanent or hard fault, and can result in the IMD 100 reverting to backup mode.

Certain types of errors (aka malfunctions) detected by the watchdogs 130, for example an uncorrectable corruption of the downloaded firmware code in RAM 124, or a memory cell which has become stuck and will no longer hold a corrected value, do not permit continued normal operation of the IMD 100. Those types of errors can trigger an immediate reversion to backup mode by the watchdogs 130. More generally, there can be one or more types of malfunctions that when detected should cause the IMD to operate in accordance with the backup mode.

In certain embodiments of the watchdogs 130, special independent circuitry or logic 145 can be provided as part of a watchdog 130, which automatically increments the counter 160 upon any non-power on reset, which occurs in backup mode. If the RAM 124 used for storing backup mode firmware's variables has a defect, that backup mode firmware might not even be able to run well enough to increment the counter 160. So the independent hardware watchdogs 130, which trigger a reset when a firmware error is detected can also use the separate circuitry or logic 145 to increment the counter 160.

The NVM 122 of the IMD 100 can provide the watchdogs 130 along with boot code that determines what application is going to be run by the processor 110 to control the operation of the IMD 100 when an error (aka malfunction) is detected by one or more of the watchdogs 130. The application used to control the IMD 100 can be a strictly NVM based application after reboot in backup mode, or a completely RAM based application, or a combination of an NVM based and a RAM based application. In certain embodiments, the application that is used to control the IMD 100 is strictly NVM based while the IMD 100 operates in its backup mode. By contrast, the application that is used to control the IMD 100 can be strictly RAM based, or a combination of NVM based and RAM based, while the IMD 100 operates in its normal mode of operation.

When the IMD 100 is reset by reset trigger circuitry 140 in the watchdogs 130, one of the first operations performed by boot-loader firmware in the NVM 122 (e.g., ROM) is to confirm the integrity of the firmware code resident in the RAM 124. This is typically performed by applying an algorithm, such as a cyclic redundancy check (CRC) or a secure hash algorithm (SHA), to a data image in RAM 124, which results in a summary "hash" that is compared to an expected value. A mismatch between calculated and expected hash values can be criteria for the IMD 100 to remain in backup mode, which does not depend on the firmware contained in the RAM 124.

If a scenario, such as repeated resets as triggered by the watchdogs 130, merits reversion to backup mode, the hash can be deliberately corrupted to force backup mode implementation. One way to do this would be for the firmware to write to the RAM 124 a value which causes a hash mismatch. In addition, a hardware register value protected with a similar SECDED mechanism as the RAM contents could be used as a portion of the image used to calculate the hash. In that case, it would be possible for hardware to directly force reversion to backup mode.

Regarding whether the counter incrementing circuitry 145 causes incrementing of the counter 160 before, during, or after reset, consider that there are three phases: (1) The MCU 110 is running and a reset is triggered (e.g. from a watchdog 130); (2) The MCU 110 is not running (so there are no memory accesses) while a reset is asserted; and (3) The MCU 110 is running again, having rebooted due to the reset. In most embodiments, the increment of counter 160 should only happen during phase (2). This is because in most circumstances, the counter 160 value should not be altered while the MCU 110 is running. Hence the importance of having a robust design of the counter 160, such as by majority voting from redundant implementations of the counter 160, that will prevent failure of the counter 160.

With the counter 160 made up of redundant counters, in the special case of a power-on reset, which happens for example at battery attachment, normal design practice would be for the power-on reset to initialize (or "clear") all the redundant counters, which make up the counter 160, to a known value. That is not an essential element of this design but is a way to ensure any redundant counter values begin their service having a same count value as one another.

Majority voting can be used when N redundant copies of the counter 160 are maintained, where N is an odd integer that is at least 3, and majority voting is used to determine a value of the counter 160 at any given time when the multiple redundant counters store different pointer values for identifying a RAM block 126.

To ensure that the circuitry making up the counter 160 is robust, separate logic can be provided with the counter 160 to implement the majority voting. With such logic, the majority voting can happen automatically in hardware with no intervention required from the firmware.

In a backup mode with firmware implemented from NVM 122, only a block 126 of the RAM 124 is used. But that block 126 of the RAM 124 that is used during the backup mode must be functional. A mitigation mechanism is, thus, used to handle the case where the malfunction which triggered backup mode is within the block 126 of RAM 124 that is used (or at least attempted to be used) to store variables for executing the backup mode firmware from the NVM 122 (e.g., ROM).

Once backup mode is entered, a reset is triggered by the reset trigger circuitry 140 in the watchdogs 130 to increment the counter 160. To make the counter 160 and associated logic simple and failsafe, operation remains simple with the counter 160 incremented upon reset. This will cause the counter 160 and associated multiplexer 162 to point to another (e.g., subsequent) one of the RAM blocks 126, even if the previous RAM block pointed to by the counter 160 is functional. In accordance with certain embodiments, the counter 160 will increment with each reset irrespective of what caused the system to go into backup mode or irrespective of the reason for the reset. In accordance with certain embodiments, when the value of the counter 160 reaches its maximum value, the next time the counter 160 will have its minimum value, i.e., the counter 160 can be implemented as a wrapping counter.

Figure 2:
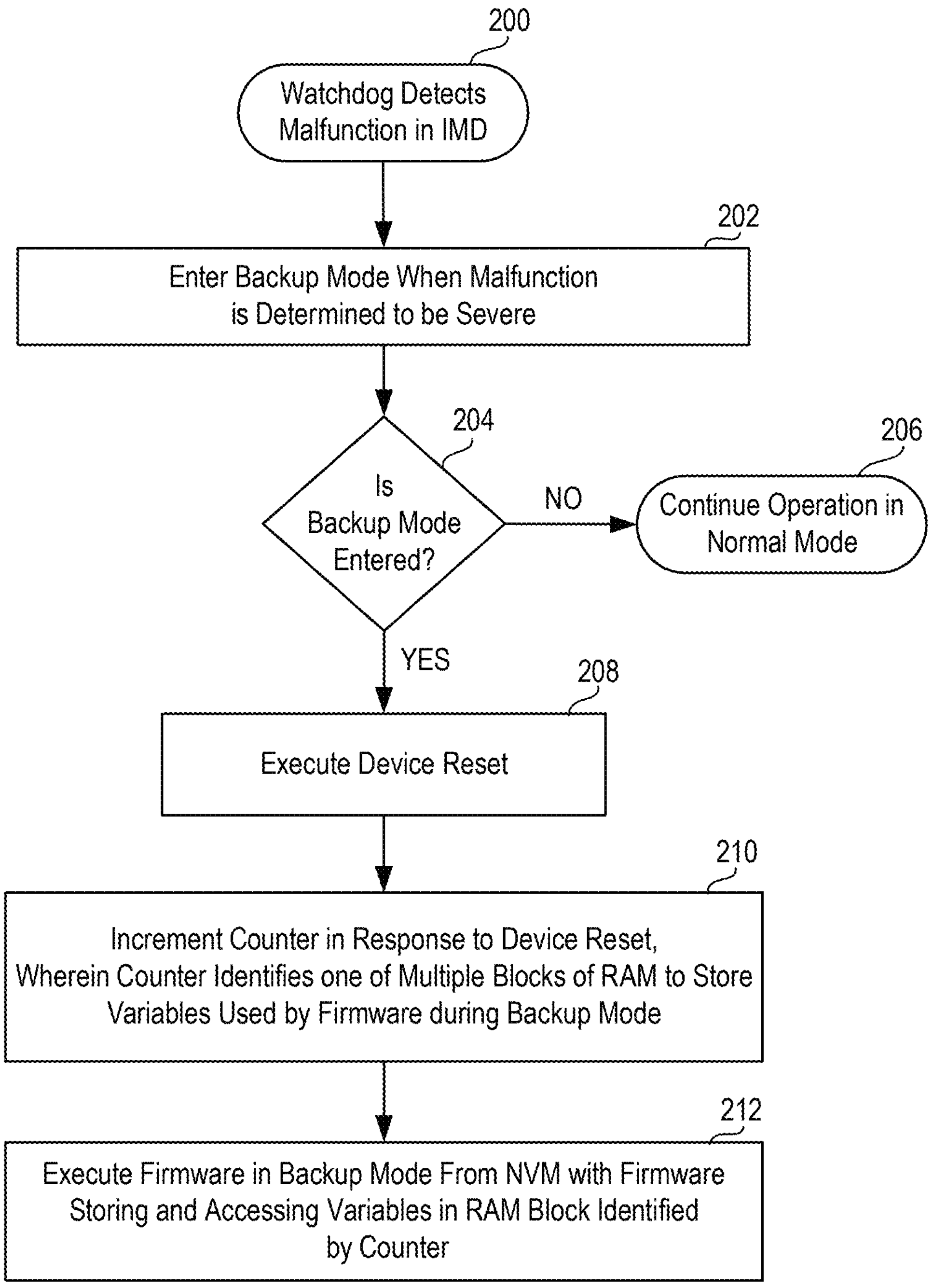
FIG. 2 is a high level flow diagram used to summarize methods of providing failsafe operation when an IMD is in backup mode and a reset occurs that causes incrementing a counter to identify a RAM block, according to certain embodiments of the present technology.

FIG. 2 is a high level flow diagram used to summarize methods of providing failsafe operation when an IMD 100 is in its backup mode and a reset occurs that causes incrementing of the counter 160 to identify the RAM block 126 according to certain embodiments of the present technology. To begin in step 200 a watchdog 130 (or more specifically, the error detection circuitry 135) detects a malfunction in the IMD 100. As indicated above, depending on the cause of the malfunction, recovery from the malfunction can occur. Thus, in step 202 the IMD 100 enters a backup mode only when the malfunction is severe enough that recovery cannot reasonably be done. Alternatively, or additionally, the IMD 100 may enter a backup mode in response to at least a predetermined number of resets occurring within a predetermined window of time. More generally, the processor 110 can be configured to enter into a backup mode in response to detection of one or more predetermined types of malfunctions that when detected should cause the IMD to operate in accordance with a backup mode. One example of such a malfunction (which can also be referred to herein as an error or failure) is at least a predetermined number of resets occurring within a predetermined window of time. In a subsequent step 204, if the backup mode is not entered, the IMD 100 continues operation in a normal non-backup mode of step 206. But if the backup mode is entered as determined in step 204, the method proceeds to step 208 where a system reset is performed. The system reset in step 208 then triggers incrementing of the counter 160 in step 210. The new counter value is then used to identify one of the multiple RAM blocks 126, in which to store the variables used by the firmware during the backup mode. The IMD 100 then proceeds in backup mode in step 212 with the firmware storing and accessing variables in the RAM block 126 identified by the new counter value. In an embodiment, the counter 160 is incremented responsive to a reset that initially causes the IMD 100 to enter the backup mode. In an alternative embodiment, the counter 160 is only incremented responsive to a reset that occurs while the IMD 100 is already operating in a backup mode. In both embodiments, if the one of the RAM blocks 126 identified by the counter 160 fails the memory test while the IMD is operating in the backup mode, the counter 160 will be incremented responsive to a further reset, and a further one of the RAM blocks 126 should eventually pass the memory test and be used to by the processor 110 to store variables while the processor 110 is executing the backup mode firmware (and thereby operating the IMD 100 in accordance with the backup mode).

Independently, each time the IMD 100 is reset while operating in backup mode, the hardware will increment counter 160. The counter 160 determines how the RAM blocks 126 are mapped to a section of address space which is used by the backup mode firmware. Thus, if there is a defect in the critical one of the RAM blocks 126 used by the backup mode firmware, upon rebooting it will be swapped with its alternate RAM block 126. Note that no RAM capacity is wasted with this scheme. No separate backup-only memory is needed, and in the normal case where there are no defects (aka no memory failures) in the RAM 124 all the blocks 126 in the RAM 124 are available for use irrespective of the state of this mapping.

In certain embodiments, the counter 160 that points to one of the blocks 126 of the RAM 124 is cleared at power-on reset, which occurs when power is first applied to circuitry of the IMD 100 (including the processor 110, the memory 120, the watchdogs 130, the therapy signal generator 150, etc.), such as during battery attach. Ideally only one power-on reset occurs in the lifetime of the IMD 100. The counter 160 should be robust and immune to bit upsets. In accordance with certain embodiments, confidence in the value of the counter 160 is established through redundancy. As a possible implementation of the counter 160 with redundancy it is feasible to replicate it several times and use majority voting to determine the correct value. In certain embodiments, the counter 160 can be as small as one or two bits, but is preferably at least three bits. If the counter 160 is only one bit it can only point to two different blocks 126 of the RAM 124. If the counter 160 is two bits it can point to four different blocks 126 of the RAM 124. If the counter 160 is three bits it can point to eight different blocks 126 of the RAM 124. If the counter 160 is four bits it can point to sixteen different blocks 126 of the RAM 124. More generally, the number of block 126 of RAM 124 that counter 160 can point to can be $2^n$, where n is how many bits are included in the counter 160.

In certain embodiments, during backup mode operation, the blocks 126 of the RAM 124 that are not being used to store variables can be powered down to conserve power. For example, if there are eight total blocks 126 of the RAM 124, power is only provided to the one block 126 of the RAM 124 identified by the counter 160, and the other seven blocks 126 of the RAM 124 can be powered down. This will preserve power or mitigate against an instance whose failure may be causing excessive power consumption.

Because the malfunction that caused the revision to the backup mode may or may not have occurred due to a failure in at least one of the blocks of the RAM 124, after each reset and before starting therapy, in some embodiments firmware and/or hardware will perform a memory test algorithm on the RAM block 126 identified by the counter 160. This will test whether the malfunction occurred due to a fault in the RAM block 126 identified by the counter 160. Testing of the RAM block 126 identified by the counter 160 can be completed very quickly due to the small amount of memory being tested, i.e., only a portion (block) of the RAM 124. For testing functionality of the RAM 124, in one embodiment the firmware operating in the NVM 122 in backup mode includes firmware to perform the RAM testing. More generally, the processor 110 can perform a memory test of the RAM block 126 identified by the counter 160. Alternatively, rather than the processor 110 performing the memory test of the RAM block 126 identified by the counter 160, the IMD can include dedicated hardware that is configured to perform the memory test of the RAM block 126 identified by the counter 160. Other variations are possible and within the scope of the embodiments described herein. If the memory test detects any failure in the RAM block 126 (identified by the counter 160), the IMD 100 will be reset again, which will again cause incrementing of the counter 160 and a memory test of the RAM block 126 identified by the counter 160 (after being incremented). This operation is described in more detail with reference to FIG. 3.

Figure 3:
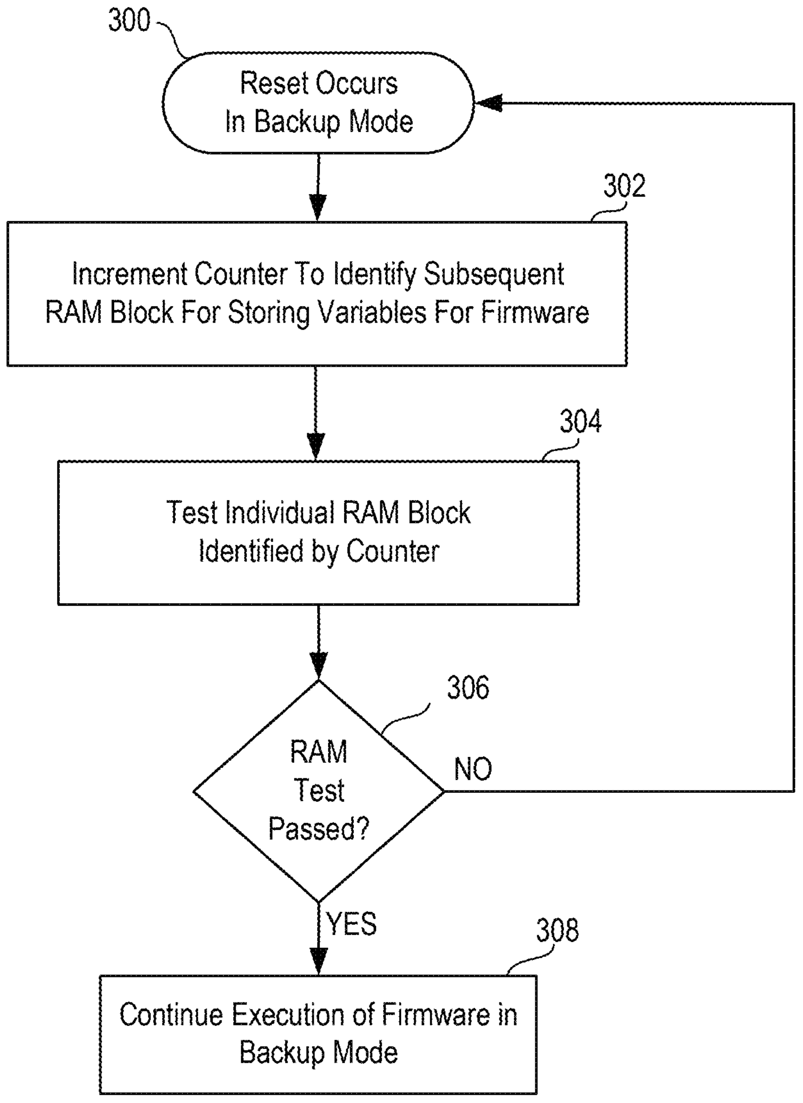
FIG. 3 is a high level flow diagram used to summarize methods of providing memory testing when a malfunction is detected after backup mode has been entered showing the counter is further incremented when a defective RAM block is identified.

In particular, FIG. 3 is a high level flow diagram used to summarize methods, according to certain embodiments of the present technology, of providing memory testing when a malfunction is detected by the error detection circuitry 135 (which can also be referred to as the malfunction detection circuitry 135) after backup mode has been entered, where this flow diagram shows the counter 160 is further incremented when a defective one of the RAM blocks 126 is identified. One of the RAM blocks 126 can be considered defective, for example, in response to one of the RAM blocks 126 failing a memory test thereof. Beginning in step 300 of FIG. 3, a reset occurs in the backup mode. In step 302 the counter 160 is incremented to identify a subsequent RAM block 126 for storing variables used by the firmware. In step 304, the RAM block 126 selected by the counter 160 is tested. In step 306, if the selected RAM block 126 fails the memory test thereof, there is return to step 300 where a new reset operation is performed and the counter 160 is again incremented in another instance of step 302. In step 306, if the newly selected RAM block 126 passes (i.e., does not fail) the memory test, then operation continues in step 308 in backup mode with the counter value selected in step 302 used to identify the RAM block 126 for storage of variables for the backup mode firmware.

Referring briefly back to FIG. 2, in the flow diagram of FIG. 2, the counter 160 was shown as being incremented at step 210 following the device reset occurring at step 208. However, it is noted that the order of step 208 and 210 can be reversed, such that the counter 160 is incremented just prior to the device reset. Similarly, in the flow diagram of FIG. 3, the counter 160 is shown as being incremented at step 302 following the device reset operation occurring at step 300 while the IMD 100 is operating in backup mode. However, it is noted that the order of steps 300 and 302 can be reversed, such that the counter 160 is incremented just prior to the device reset occurring while the IMD 100 is operating in backup mode. More generally, in accordance with certain embodiments of the present technology, the counter 160 is incremented in conjunction with a device reset operation that occurs in response to the detection of the malfunction that causes the processor 110 to operate the IMD 100 in accordance with the backup mode, as well as occurs in response to a detection of a further malfunction that is detected while the processor 110 operates the IMD 100 in accordance with the backup mode.

Figure 4:
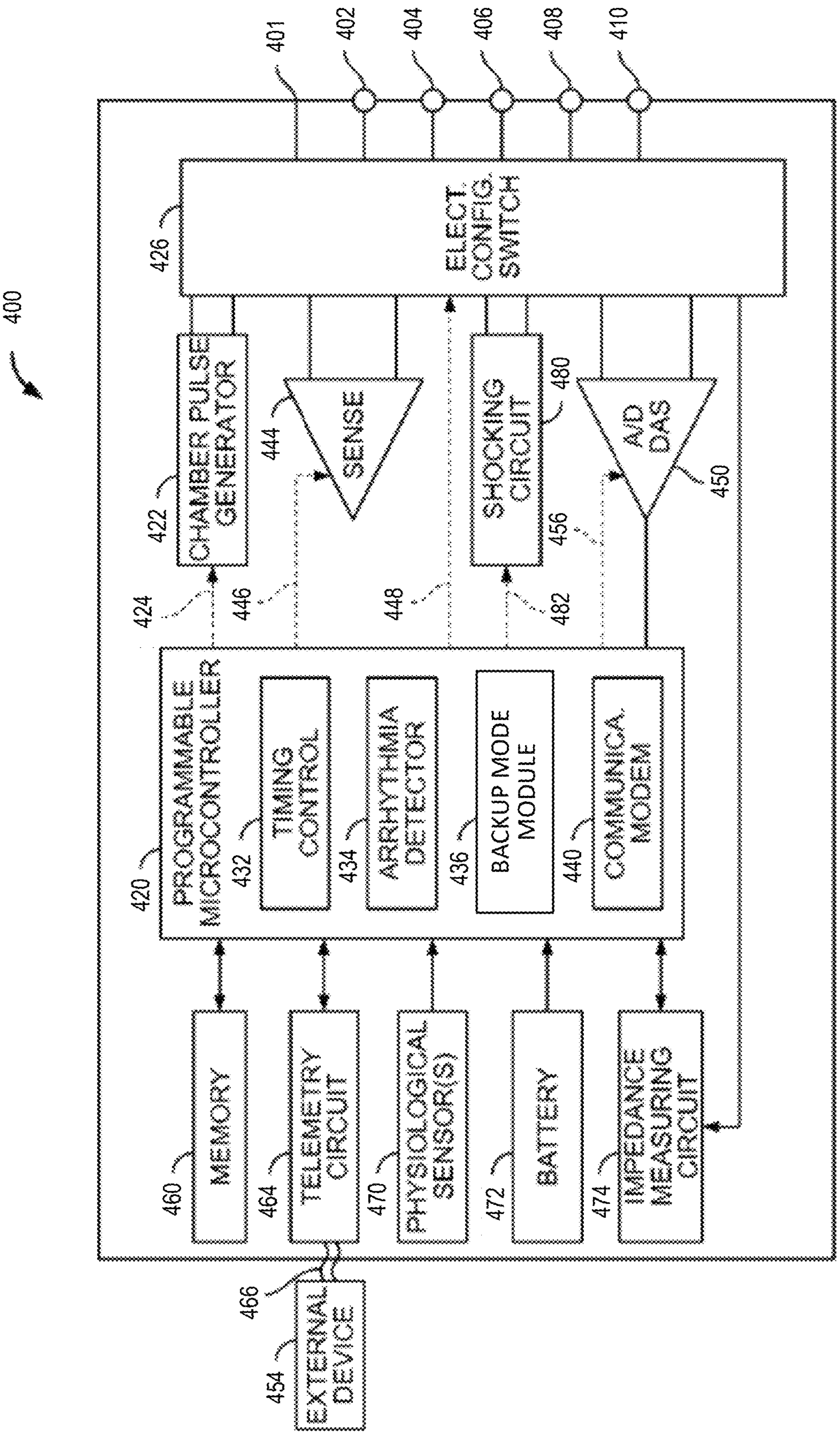
FIG. 4 shows a block diagram illustrating an IMD, which can be a specific implementation of the IMD introduced in FIG. 1.

FIG. 4 shows a block diagram illustrating an IMD 400, which can be a specific implementation of the IMD 100 introduced above with reference to FIG. 1. The IMD 400 may be implanted into a patient as (or as part of) an implantable cardiac system in accordance with certain embodiments herein. The IMD 400 can be capable of performing cardiac pacing and/or cardiac defibrillation, but is not limited thereto.

The IMD 400 has a housing 401 to hold the electronic/computing components. Housing 401 (which is often referred to as the "can", "case", "encasing", or "case electrode") may be programmable to act as the return electrode for certain stimulus modes. Housing 401 may further include a connector (not shown) with a plurality of terminals 402, 404, 406, 408, and 410. The terminals 402, 404, 406, 408, and 410 may be connected to electrodes that are located one or more cardiac leads or in various locations on housing 401 (if the IMD 400 is a leadless device) or elsewhere within and about the heart. The IMD 400 includes a programmable microcontroller 420 that controls various operations of the IMD 400, including cardiac monitoring and stimulation therapy. The microcontroller 420 is a specifical implementation of the MCU 110 introduced above in the discussion of FIG. 1. Microcontroller 420 includes a microprocessor (or equivalent control circuitry), and may also include RAM and/or NVM (e.g., ROM) memory, logic and timing circuitry, state machine circuitry, and I/O circuitry.

The IMD 400 further includes a pulse generator 422 that generates stimulation pulses for delivery by one or more electrodes coupled thereto. Pulse generator 422 is controlled by microcontroller 420 via control signal 424. Pulse generator 422 may be coupled to the select electrode(s) via an electrode configuration switch 426, which includes multiple switches for connecting the desired electrodes to the appropriate I/O circuits, thereby facilitating electrode programmability. Switch 426 is controlled by a control signal 428 from microcontroller 420.

In the embodiment of FIG. 4, a single pulse generator 422 is illustrated. Optionally, the IMD 400 may include multiple pulse generators, similar to pulse generator 422, where each pulse generator is coupled to one or more electrodes and controlled by microcontroller 420 to deliver select stimulus pulse(s) to the corresponding one or more electrodes. The pulse generator 422 is a specific implementation of the therapy signal generator 150 introduced above with reference to FIG. 1.

Microcontroller 420 is illustrated as including timing control circuitry 432 to control the timing of the stimulation pulses (e.g., pacing rate, atrio-ventricular (AV) delay, atrial interconduction (A-A) delay, or ventricular interconduction (V-V) delay, etc.). Timing control circuitry 432 may also be used for the timing of refractory periods, blanking intervals, noise detection windows, evoked response windows, alert intervals, marker channel timing, and so on. Microcontroller 420 optionally has an arrhythmia detector 434 for detecting arrhythmia conditions. Microcontroller 420 is also shown as including a backup mode module 436, which can be used for controlling therapy and other IMD functions when the IMD 400 reverts to its backup mode. Although not shown, the microcontroller 420 may further include other dedicated circuitry and/or firmware/software components that assist in monitoring various conditions of the patient's heart and managing pacing therapies.

The IMD 400 is further equipped with a communication modem (modulator/demodulator) 440 to enable wireless communication with other devices. In one implementation, modem 440 may use low or high frequency modulation. As one example, modem 440 may transmit implant-to-implant (i2i) messages and other signals through conductive communication between a pair of electrodes. The modem 440 can alternatively, or additionally, be used to provide RF communication and/or inductive communication. Modem 440 may be implemented in hardware as part of microcontroller 420, or as software/firmware instructions programmed into and executed by microcontroller 420. Alternatively, modem 440 may reside separately from the microcontroller as a standalone component.

The IMD 400 includes a sensing circuit 444 selectively coupled to one or more electrodes, which perform sensing operations, through switch 426 to detect the presence of cardiac activity in the right chambers of the heart. Sensing circuit 444 may include dedicated sense amplifiers, multiplexed amplifiers, or shared amplifiers. It may further employ one or more low power, precision amplifiers with programmable gain and/or automatic gain control, bandpass filtering, and threshold detection circuit to selectively sense the cardiac signal of interest. The automatic gain control enables the unit to sense low amplitude signal characteristics of atrial fibrillation. Switch 426 determines the sensing polarity of the cardiac signal by selectively closing the appropriate switches. In this way, the clinician may program the sensing polarity independent of the stimulation polarity.

The output of sensing circuit 444 is connected to microcontroller 420 which, in turn, triggers or inhibits the pulse generator 422 in response to the presence or absence of cardiac activity. Sensing circuit 444 receives a control signal 446 from microcontroller 420 for purposes of controlling the gain, threshold, polarization charge removal circuitry (not shown), and the timing of any blocking circuitry (not shown) coupled to the inputs of the sensing circuitry.

In the embodiment of FIG. 4, a single sensing circuit 444 is illustrated. Optionally, the IMD 400 may include multiple sensing circuits, similar to sensing circuit 444, where each sensing circuit is coupled to one or more electrodes and controlled by microcontroller 420 to sense electrical activity detected at the corresponding one or more electrodes. Sensing circuit 444 may operate in a unipolar sensing configuration or in a bipolar sensing configuration.

IMD 400 further includes an analog-to-digital (A/D) data acquisition system (DAS) 450 coupled to one or more electrodes via switch 426 to sample cardiac signals across any pair of desired electrodes. Data acquisition system 450 is configured to acquire intracardiac electrogram signals, convert the raw analog data into digital data, and store the digital data for later processing and/or telemetric transmission to an external device 454 (e.g., a programmer, local transceiver, or a diagnostic system analyzer). Data acquisition system 450 is controlled by a control signal 456 from the microcontroller 420.

Microcontroller 420 is coupled to a memory 460 by a suitable data/address bus. The programmable operating parameters used by microcontroller 420 are stored in memory 460 and used to customize the operation of IMD 400 to suit the needs of a particular patient. Such operating parameters define, for example, pacing pulse amplitude, pulse duration, electrode polarity, rate, sensitivity (e.g., a sense detection threshold or gain), automatic features, arrhythmia detection criteria, and the amplitude, waveshape and vector of each shocking pulse to be delivered to the patient's heart within each respective tier of therapy. The memory 460 can be the same as the memory 120 introduced above with reference to FIG. 1, and thus, may include NVM and RAM. It would also be possible for the NVM and/or the RAM, or at least portions thereof, to be included as part of the microcontroller 420, as was mentioned above.

The operating parameters of IMD 400 may be non-invasively programmed into memory 460 through a telemetry circuit 464 in telemetric communication via communication link 466 with external device 454. Telemetry circuit 464 allows intracardiac electrograms and status information relating to the operation of IMD 400 (as contained in microcontroller 420 or memory 460) to be sent to external device 454 through communication link 466.

The IMD 400 can further include magnet detection circuitry (not shown), coupled to microcontroller 420, to detect when a magnet is placed over the unit. A magnet may be used by a clinician to perform various test functions of IMD 400 and/or to signal microcontroller 420 that external device 454 is in place to receive or transmit data to microcontroller 420 through telemetry circuits 464.

The IMD 400 can optionally include one or more physiological sensors 470. Such sensors 470 are commonly referred to as "rate-responsive" sensors because they are typically used to adjust pacing stimulation rates according to the exercise state of the patient. However, physiological sensor 470 may further be used to detect changes in cardiac output, changes in the physiological condition of the heart, or diurnal changes in activity (e.g., detecting sleep and wake states). Signals generated by physiological sensors 470 are passed to microcontroller 420 for analysis. Microcontroller 420 responds by adjusting the various pacing parameters (such as rate, AV Delay, V-V Delay, etc.) at which the atrial and ventricular pacing pulses are administered. While shown as being included within IMD 400, physiological sensor(s) 470 may be external to IMD 400, yet still be implanted within or carried by the patient. Examples of physiologic sensors might include sensors that, for example, sense respiration rate, pH of blood, ventricular gradient, activity, position/posture, minute ventilation (MV), and so forth.

A battery 472 provides operating power to all of the components in IMD 400. Battery 472 is capable of operating at low current drains for long periods of time, and is capable of providing high-current pulses (for capacitor charging) when the patient requires a shock pulse (e.g., in excess of 2 A, at voltages above 2 V, for periods of 10 seconds or more). Battery 472 also desirably has a predictable discharge characteristic so that elective replacement time can be detected. As one example, IMD 400 employs lithium/silver vanadium oxide batteries.

The IMD 400 optionally includes an impedance measuring circuit 474, which can be used for many things, including: lead impedance surveillance during the acute and chronic phases for proper lead positioning or dislodgement; detecting operable electrodes and automatically switching to an operable pair if dislodgement occurs; measuring respiration or minute ventilation; measuring thoracic impedance for determining shock thresholds; detecting when the device has been implanted; measuring stroke volume; and detecting the opening of heart valves; and so forth. Impedance measuring circuit 474 is coupled to switch 426 so that any desired electrode may be used. In this embodiment IMD 400 further includes a shocking circuit 480 coupled to microcontroller 420 by a data/address bus 882.

While not specifically shown in FIG. 4, the IMD 400 can also include the watchdogs 130, error detection circuitry 135, the reset triggering circuitry 140, the counter incrementing circuitry 145, the counter 160, and the multiplexer 162, described above with reference to FIG. 1.

An aspect of the present technology is related to an IMD 100, 400 that includes a NVM 122, a RAM 124, a processor 110, 420 and a counter 160. The NVM 122 stores backup mode firmware. The RAM 124 includes multiple separate RAM blocks 126. The processor 110, 420 is configured to execute the backup mode firmware to operate the IMD 100, 400 in accordance with a backup mode in response to detection of a malfunction that when detected should cause the IMD to operate in accordance with the backup mode. While the processor 119 operates the IMD in accordance with the backup mode the processor is configured to store and access variables in one of the RAM blocks 126. The counter 160 is configured to be selectively incremented and used to select which one of the RAM blocks 126 the variables are stored within while the processor 110, 420 executes the backup mode firmware to operate the IMD in accordance with the backup mode.

In certain embodiments, the counter 160 is optionally incremented in conjunction with a device reset operation that occurs in response to the detection of the malfunction that causes the processor 110, 420 to operate the IMD in accordance with the backup mode, and the counter 160 is incremented in conjunction with a detection of a further malfunction that is detected while the processor operates the IMD in accordance with the backup mode. A counter incrementing circuit 145 can be configured to perform the aforementioned incrementing of the counter 160.

In certain embodiments, the IMD includes circuitry 135 configured to detect the malfunction that causes the processor 110, 420 to operate the IMD in accordance with the backup mode. In certain such embodiments, the circuitry 135 configured to detect the malfunction causes the device reset operation. In certain embodiments, the circuitry 135 configured to detect the malfunction uses one or more watchdogs 130 to detect the malfunction.

In certain embodiments, after the device reset operation is performed that results in the counter being incremented the processor and/or further circuitry is configured to perform a memory test on the one of the RAM blocks 126 selected using the counter. In certain such embodiments, in response to the one of the RAM blocks selected using the counter failing the memory test, a further instance of the device reset operation is performed, which results in the counter being further incremented and used to select a different one of the RAM blocks 126 for storing the variables while the processor operates the IMD in accordance with the backup mode. The processor 110 can be configured to perform the memory test, or alternatively, the IMD can include dedicated hardware that is configured to perform the memory test.

In certain embodiments, the counter 160 is implemented using one or more logic gates and maintains one or more bits.

In certain embodiments, a multiplexer 162 that is controlled by the counter to identify the one of the RAM blocks 126 within which the variables are stored by the processor while the processor executes the backup mode firmware to operate the IMD in accordance with the backup mode.

In certain embodiments, N copies of the counter 160 are maintained, where N is an odd integer that is at least 3, and majority voting is used to determine a value of the counter at any given time.

In certain embodiments, at least some firmware or variables that had previously been stored in the one of the RAM blocks 126 during a normal operational mode, are replaced by the variables that are stored while the processor 110, 420 executes the backup mode firmware to operate the IMD in accordance with the backup mode.

An aspect of the present technology is directed to a method for use with an IMD 100, 400 that includes a processor 110, 420, a counter 160, a NVM 122 that stores backup mode firmware, and a RAM 124 that includes multiple separate RAM blocks 126. The method comprises: monitoring for and detecting a malfunction that when detected should cause the IMD to operate in accordance with a backup mode; in response to the malfunction being detected, performing a device reset operation of the IMD, incrementing the counter 160, and the processor 110, 420 executing the backup mode firmware and thereby operating the IMD in accordance with the backup mode; and while the processor 110 is executing the backup mode firmware and thereby operating the IMD in accordance with the backup mode, the processor storing and accessing variables in one of the RAM blocks 126 identified using the counter 160 following the incrementing of the counter 160.

An aspect of the present technology is directed to a method comprising: monitoring for and detecting a malfunction that when detected should cause an IMD 100, 400 to operate in accordance with a backup mode; in response to the malfunction being detected, performing a device reset operation of the IMD, incrementing a counter 160 of the IMD, and a processor 110, 420 of the IMD executing backup mode firmware stored in a NVM 122 of the IMD and thereby operating the IMD in accordance with the backup mode; and while the processor 110, 420 is executing the backup mode firmware and thereby operating the IMD in accordance with the backup mode, the processor 110, 420 storing and accessing variables in one of multiple RAM blocks 126 included in a RAM 124 of the IMD identified using the counter following the incrementing of the counter.

In certain embodiments, the method further includes, while the processor is executing the backup mode firmware and thereby operating the IMD in accordance with the backup mode, detecting a further malfunction; and in response to the further malfunction being detected, performing a further device reset operation of the IMD, further incrementing the counter 160, and the processor 110, 420 re-executing the backup mode firmware and thereby further operating the IMD in accordance with the backup mode. Additionally, while the processor 110 is re-executing the backup mode firmware and thereby further operating the IMD in accordance with the backup mode, the method includes the processor storing and accessing variables in another one of the RAM blocks 126 identified using the counter 160 after the further incrementing of the counter 160.

In certain embodiments, the monitoring for and detecting the malfunction is performed using one or more watchdogs 130.

In certain embodiments, the method comprises, after performing the device reset operation that results in the counter 160 being incremented: performing a memory test operation on the one of the RAM blocks 126 identified using the counter 160; and in response to the one of the RAM blocks 126 identified using the counter 160 failing the memory test, detecting a further malfunction and performing a further instance of the device reset operation, which results in the counter 160 being further incremented and used to identify another one of the RAM blocks 126 for storing the variables while the processor is re-executing the backup mode firmware and thereby further operating the IMD in accordance with the backup mode.

In certain embodiments, the method comprises using a multiplexer 162, controlled by the counter 160, to identify the one of the RAM blocks 126 within which the variables are stored by the processor 112 while the processor 112 is executing the backup mode firmware and thereby operating the IMD in accordance with the backup mode.

In certain embodiments, the method comprises maintaining N copies of the counter 160, where N is an odd integer that is at least 3, and using majority voting to determine a value of the counter 160 at any given time.

In certain embodiments, the method comprises replacing at least some firmware or variables that had previously been stored in the one of the RAM blocks 126 during a normal operational mode, with the variables that are stored while the processor 110 is executing the backup mode firmware and thereby operating the IMD in accordance with the backup mode.

Certain embodiments of the present technology are directed to an IMD including a NVM 122 that stores backup mode firmware, a RAM 124 that includes multiple separate RAM blocks 126, a processor 110, 420 and a counter 160. The processor 110 executes the backup mode firmware to operate the IMD in accordance with a backup mode, wherein when the processor 110, 420 operates the IMD in the backup mode the processor stores and accesses variables in one of the RAM blocks 126. The counter 160 is selectively incremented after a reset operation and used to select which one of the RAM blocks 126 the variables are stored within.

In certain embodiments, after the reset operation occurs: a memory test is performed on the one of the RAM blocks 126 selected using the counter 160, and in response to the one of the RAM blocks 126 selected using the counter 160 failing the memory test, a further device reset operation is performed, which results in the counter 160 being further incremented and used to select a different one of the RAM blocks 126 for storing the variables.

In certain embodiments, at least some of the firmware that had previously been stored in the RAM 124 during a normal operational mode is provided in NVM 122 during the backup mode.

The subject matter described herein may be embodied in systems, apparatus, methods, and/or articles depending on the desired configuration. In particular, various implementations of the subject matter described herein may be realized in software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as firmware, programs, software, software applications, applications, components, or code) include machine instructions for a programmable processor and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user to control an IMD separate from the patient, certain subject matter described herein may be communicated from the IMD to a computer having a display device (e.g., a touch-sensitive display, a non-touch sensitive display monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input, depending upon implementation.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of high level building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An implantable medical device (IMD), comprising:

a non-volatile memory (NVM) that stores backup mode firmware;

a random access memory (RAM) that includes multiple separate RAM blocks;

a processor that executes the backup mode firmware to operate the IMD in accordance with a backup mode in response to detection of a malfunction that when detected causes the IMD to operate in accordance with the backup mode, wherein while the processor operates the IMD in accordance with the backup mode, the processor stores and accesses variables in one of the RAM blocks; and a counter that is selectively incremented and used to select which one of the RAM blocks the variables are stored within while the processor executes the backup mode firmware to operate the IMD in accordance with the backup mode.

2. The IMD of claim 1, wherein:

the counter is optionally incremented in conjunction with a device reset operation that occurs in response to the detection of the malfunction that causes the processor to operate the IMD in accordance with the backup mode; and the counter is incremented in conjunction with a detection of a further malfunction that is detected while the processor operates the IMD in accordance with the backup mode.

3. The IMD of claim 2, further comprising:

circuitry configured to detect the malfunction that causes the processor to operate the IMD in accordance with the backup mode.

4. The IMD of claim 3, wherein the circuitry configured to detect the malfunction causes the device reset operation.

5. The IMD of claim 3, wherein the circuitry configured to detect the malfunction uses one or more watchdogs to detect the malfunction.

6. The IMD of claim 2, wherein:

after the device reset operation is performed that results in the counter being incremented, the processor and/or further circuitry of the IMD is configured to perform a memory test on the one of the RAM blocks selected using the counter; and in response to the one of the RAM blocks selected using the counter failing the memory test, a further instance of the device reset operation is performed, which results in the counter being further incremented and used to select a different one of the RAM blocks for storing the variables while the processor operates the IMD in accordance with the backup mode.

7. The IMD of claim 1, wherein the counter is implemented using one or more logic gates and maintains one or more bits.

8. The IMD of claim 1, further comprising:

a multiplexer that is controlled by the counter to identify the one of the RAM blocks within which the variables are stored by the processor while the processor executes the backup mode firmware to operate the IMD in accordance with the backup mode.

9. The IMD of claim 1, wherein N copies of the counter are maintained, where N is an odd integer that is at least 3, and majority voting is used to determine a value of the counter at any given time.

10. The IMD of claim 1, wherein at least some firmware or variables that had previously been stored in the one of the RAM blocks during a normal operational mode, are replaced by the variables that are stored while the processor executes the backup mode firmware to operate the IMD in accordance with the backup mode.

11. A method for use with an implantable medical device (IMD) that includes a processor, a counter, a non-volatile memory (NVM) that stores backup mode firmware, and a random access memory (RAM) that includes multiple separate RAM blocks, the method comprising:

monitoring for and detecting a malfunction that when detected causes the IMD to operate in accordance with a backup mode;

in response to the malfunction being detected, performing a device reset operation of the IMD, incrementing the counter, and the processor executing the backup mode firmware and thereby operating the IMD in accordance with the backup mode; and while the processor is executing the backup mode firmware and thereby operating the IMD in accordance with the backup mode, the processor storing and accessing variables in one of the RAM blocks identified using the counter following the incrementing of the counter.

12. The method of claim 11, further comprising:

while the processor is executing the backup mode firmware and thereby operating the IMD in accordance with the backup mode, detecting a further malfunction;

in response to the further malfunction being detected, performing a further device reset operation of the IMD, further incrementing the counter, and the processor re-executing the backup mode firmware and thereby further operating the IMD in accordance with the backup mode; and while the processor is re-executing the backup mode firmware and thereby further operating the IMD in accordance with the backup mode, the processor storing and accessing variables in another one of the RAM blocks identified using the counter after the further incrementing of the counter.

13. The method of claim 11, wherein the monitoring for and detecting the malfunction is performed using one or more watchdogs.

14. The method of claim 11, further comprising, after performing the device reset operation that results in the counter being incremented:

performing a memory test operation on the one of the RAM blocks identified using the counter; and in response to the one of the RAM blocks identified using the counter failing the memory test, detecting a further malfunction and performing a further instance of the device reset operation, which results in the counter being further incremented and used to identify another one of the RAM blocks for storing the variables while the processor is re-executing the backup mode firmware and thereby further operating the IMD in accordance with the backup mode.

15. The method of claim 11, further comprising:

using a multiplexer, controlled by the counter, to identify the one of the RAM blocks within which the variables are stored by the processor while the processor is executing the backup mode firmware and thereby operating the IMD in accordance with the backup mode.

16. The method of claim 11, further comprising maintaining N copies of the counter, where N is an odd integer that is at least 3, and using majority voting to determine a value of the counter at any given time.

17. The method of claim 11, further comprising replacing at least some firmware or variables that had previously been stored in the one of the RAM blocks during a normal operational mode, with the variables that are stored while the processor is executing the backup mode firmware and thereby operating the IMD in accordance with the backup mode.

18. An implantable medical device (IMD), comprising:

a non-volatile memory (NVM) that stores backup mode firmware;

a random access memory (RAM) that includes multiple separate RAM blocks;

a processor that executes the backup mode firmware to operate the IMD in accordance with a backup mode, wherein when the processor operates the IMD in accordance with the backup mode, the processor stores and accesses variables in one of the RAM blocks; and a counter that is selectively incremented after a reset operation and used to select which one of the RAM blocks the variables are stored within while the processor operates the IMD in accordance with the backup mode.

19. The IMD of claim 18, wherein after the reset operation occurs:

a memory test is performed on the one of the RAM blocks selected using the counter; and in response to the one of the RAM blocks selected using the counter failing the memory test, a further device reset operation is performed, which results in the counter being further incremented and used to select a different one of the RAM blocks for storing the variables.

20. The IMD of claim 18, wherein at least some of the firmware that had previously been stored in the RAM during a normal operational mode is provided in NVM during the backup mode.

* * * * *